May 24, 1960     A. M. CARTER     2,937,600

PUMP LINER PACKING APPARATUS

Filed April 21, 1958

INVENTOR.
ARTHUR M. CARTER
BY *Elliott & Pastoriza*
ATTORNEYS

United States Patent Office 2,937,600
Patented May 24, 1960

2,937,600

PUMP LINER PACKING APPARATUS

Arthur M. Carter, Rte. 1, Box 76E, Saugus, Calif.

Filed Apr. 21, 1958, Ser. No. 729,791

3 Claims. (Cl. 103—216)

This invention relates generally to fluid pumps of the reciprocating type and more particularly to a novel pump liner packing apparatus for automatically maintaining a consistently tight packing between the pump liner cylinder and the pump body.

After prolonged use, conventional pumps develop leaks as a result of wear of the cylinder liner packing. It is conventional practice, therefore, to remove the cylinder head and replace the liner packing as the occasion demands.

The present invention has as its primary object the provision of an apparatus for automatically tightening and maintaining tight the liner packing in fluid pumps whereby the useful life of the liner packing is greatly extended.

More particularly, it is an object to provide a liner tightening assembly for insuring a fluid tight liner packing which may be incorporated in conventional fluid pumps in place of the conventional cylinder retainers without any other modification of the pump itself, to the end that maintenance problems on such pumps are considerably decreased and maximum use is made of any one liner packing before replacement is necessary.

Still another object is to provide an apparatus for carrying out the above objects which does not require any external energizing source, but on the contrary takes advantage of the pressure developed within the pump itself for continuously maintaining a desired constant pressure on the liner packing and thus insure that this packing is always tight.

These and many other objects and advantages of the present invention are attained, briefly, by providing a modified retaining member and a booster cylinder disposed in the pump in place of the conventional cylinder liner retainer. The booster cylinder is provided with two cylindrical cavities receiving two pistons of different diameters, the smaller diameter piston being subject to the pressure of the fluid being pumped. The larger diameter piston is fixed, preferably to the cylinder head, and arranged to movably mount the booster cylinder. By providing a passage and check valve interconnecting the two cavities, a pressure multiplication may be effected as a consequence of the different diameter pistons within the booster cylinder, to move the booster cylinder and modified liner away from the cylinder head and thus provide a pressure greater than the normal fluid pressure, against the liner packing. Any subsequent loosening of the packing as a consequence of wear will result in a decrease in the reaction pressure on the modified liner and booster cylinder which will be compensated for immediately by further movement of these members towards the packing to maintain a constant pressure on the packing.

A better understanding of a preferred embodiment of the invention will be had by referring to the accompanying drawings in which.

Figure 1:
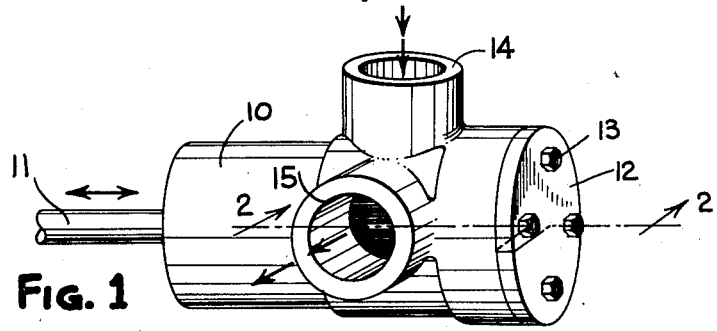
Figure 1 is an overall perspective view of a conventional fluid pump body.

Referring first to Figure 1, there is shown a conventional fluid pump body 10 with piston rod 11 extending from the left end thereof. The pump is driven in a conventional manner by a suitable motor (not shown) coupled to reciprocate the piston rod 11 as indicated by the double headed arrows. At the right hand end of the pump body 10 there is shown the usual cylinder head 12 secured in place as by bolts 13. An inlet opening is provided at 14 and an outlet opening at 15. Ordinarily there will be included check valves in the inlet and outlet passages connecting to the inlet and outlet openings 14 and 15, respectively, so that reciprocating movement of the piston head within the pump body 10 will cause fluid to flow in the direction of the arrows. These conventional check valves are not shown as they form no part of the present invention and are entirely conventional.

Figure 2:
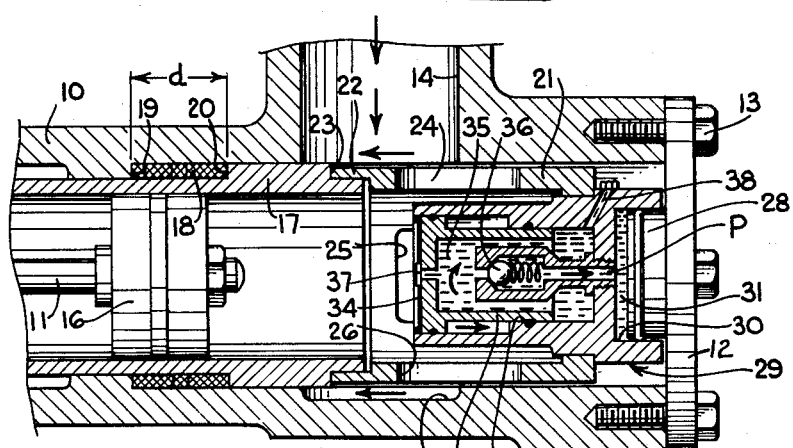
Figure 2 is an enlarged view partly in cross section of the pump body of Figure 1 illustrating the novel liner packing tightening assembly incorporated in the pump.

Referring now to Figure 2, the details of the interior of the pump are shown as including a piston head 16 secured to the piston rod 11 for reciprocal movement within a conventional cylinder liner 17. A fluid tight cylinder liner packing 18 is disposed between the liner 17 and body 10 and suitably confined by annular shouldered portions 19 and 20 on the body 10 and liner 17, respectively. The cylinder liner 17 is conventionally retained in place by a cylinder liner retainer which would be positioned between the cylinder head 12 and the ends of the cylinder liner 17. In place of this conventional liner retainer there is provided a modified cylinder liner retainer 21, in Figure 2, arranged to co-operate with apparatus for maintaining the fluid liner packing 18 tight.

As shown in Figure 2, the annular end 22 of the retainer 21 abuts against an annular shoulder 23 formed in the right hand end of the cylinder liner 17. Thus, any movement of the retainer 21 to the left as viewed in Figure 2 will exert tightening pressure on the liner packing 18. The retainer 21 includes suitable openings such as at 24, 25, and 26 to permit fluid to pass from the inlet opening 14 to an annular passage 27 in the pump body 10 and out the outlet opening 15 of Figure 1.

The assembly for maintaining a constant pressure on the retainer 21 such as to urge it to the left as viewed in Figure 2, includes a stationary piston 28 concentrically secured to the cylinder head 12. A booster cylinder 29 includes a first cylindrical cavity 30 arranged to telescope over the stationary piston 28. A first fluid chamber 31 is thus defined between the end of the piston 28 and the interior of the cavity 30. The booster cylinder 29 also includes a second cavity 32 extending into its left hand end and arranged to receive a booster piston 33. The piston 33 is prevented from moving out of the cylindrical cavity 32 by a retaining ring 34 at the entrance portion of the left hand end of the booster cylinder. Suitable O-ring seals are provided about the stationary piston 28 and booster piston 33 to insure fluid tight sliding engagement with the walls of the two cavities of the booster cylinder.

The interior of the piston 33 is hollow to define with the interior of the second cavity 32 a second fluid chamber 35. This second chamber is placed in communication with the first chamber 31 by a fluid passage P including a check valve 36. The check valve 36 permits fluid to flow only from the second chamber 35 to the first chamber 31 and prevents back flow of hydraulic fluid from the chamber 31 to the chamber 35. A small cap 37 covers a fill opening in the piston 33 to enable hydraulic fluid to be introduced into the chamber 35 and chamber 31. An air escape bleeder hole 38 normally closed by a cap permits all air to escape during this filling process.

In the operation of the packing apparatus, hydraulic fluid is first introduced through the fill opening 37 and air escapes through the air bleed hole 38. The entire interior of the chamber 35 is filled with the hydraulic fluid as well as the interior of the chamber 31. Initially, the larger cylindrical cavity 30 is telescoped completely over the stationary piston 28 on the cylinder head 12.

The cylinder head of a conventional fluid pump may then be removed and the conventional liner retainer (not shown) extracted. The new cylinder head 12, booster cylinder 29, liner 21, and associated components are then inserted in the pump in place of the conventional liner and the cylinder head 12 is secured in place by the bolts 13. It is to be noted that no modification of the conventional fluid pump is necessary except for the foregoing substitution.

With the elements in their positions as illustrated in Figure 2, reciprocation of the piston head 16 within the cylinder liner 17 will draw fluid in through the inlet opening 14 and force it out through the outlet opening 15 of Figure 1 in a conventional manner. The face of the booster piston 33, however, will be subject to the fluid pressure when the piston head 16 is moving to the right and this will result in a sliding to the right of the piston 33 to compress the hydraulic fluid in chamber 35. The compressed fluid will then force the check valve 36 open and flow into the chamber 31. The build up of pressure in the chamber 31 will in turn cause the entire booster cylinder structure 29 to move to the left since the area of the larger diameter piston 28 is greater than the area of the piston 33.

Movement of the entire booster cylinder to the left will urge the liner retainer 21 against the cylinder liner 17 to compress the packing 18. Because of the check valve 36, fluid cannot back flow from the chamber 31 into the chamber 35 and thus the established pressure in the chamber 31 will be maintained through the medium of the retainer 21 and liner 17 against the packing 18.

Throughout continuous use of the pump, wearing of the packing 18 will result in a reduction of the back pressure exerted by the packing against the retainer 21. As this occurs, the pressure of the fluid on the piston 33 will move it further inwardly to the right to force more fluid from the chamber 35 to the chamber 31 which in turn will telescope the booster cylinder further to the left and thus urge the cylinder liner 17 into tight engagement again with the packing 18.

Figure 3:
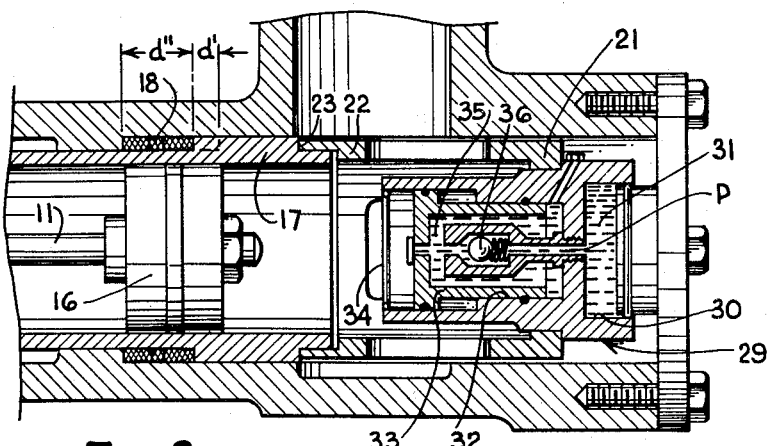
Figure 3 is a view similar to Figure 2 illustrating the relative position of the various parts after the liner packing has suffered a certain amount of wear such that tightening of the same is necessary.

Figure 3 illustrates the relative positions of the various pistons and retainer after prolonged use wherein the packing 18 has diminished in its length dimension $d$. It will be noted, however, that the cylinder liner 17 is still maintained in tight engagement with the packing in spite of a reduction $d'$ of the packing length from the dimension $d$ of Figure 2 to the dimension $d''$ of Figure 3. In other words, the booster cylinder has effectively moved the liner 17 to the left through the small distance $d'$ over a continuous period of time to continuously compensate for wear in the packing and insure that it remains tight.

From the foregoing description, it will be evident that the present invention provides a novel apparatus for maintaining fluid pump cylinder liner packings in a tightened condition and further that this effective tightening pressure is maintained continuously and automatically.

Various modifications that fall within the scope and spirit of the present invention will readily occur to those skilled in the art. The apparatus is, therefore, not to be thought of as limited to the specific embodiment disclosed for illustrative purposes.

What is claimed is:

1. In a fluid pump having a cylinder liner, a liner packing, and a cylinder head, a packing tightener for said cylinder liner comprising: a liner packing retainer having one end disposed against said cylinder liner to exert pressure on said packing; and hydraulic pressure multiplying means disposed between the other end of said retainer and said cylinder head whereby the pressure of fluid pumped is multiplied and applied to said retainer to maintain said packing tight; and, check valve means embodied in said hydraulic pressure multiplying means preventing a decrease in said hydraulic pressure multiplying means in response to a drop in said pressure of fluid pumped.

2. In a fluid pump having a cylinder liner and a liner packing therefor, means for maintaining said liner packing tight comprising: a booster cylinder disposed in said pump and having two cylindrical cavities of different diameters; two pistons of different diameters, the smaller diameter piston being receivable in one of said cylindrical cavities and subject to the pressure of fluid pumped, and the larger diameter piston being fixed to a body portion of said pump and telescopically receiving the other of said cylindrical cavities to movably mount said booster cylinder for movement towards said cylinder liner; a passage including check valve means interconnecting said cavities for passing fluid from said one cylindrical cavity to said other cylindrical cavity and blocking flow of fluid in a reverse direction; and a retaining means disposed between said booster cylinder and said cylinder liner such that movement of said booster cylinder in response to pressure build up in said cavities urges said retaining means against said cylinder liner to compress said liner packing.

3. In a fluid pump including a cylinder liner, a pump body supporting said liner, a liner packing between said liner and pump body, a cylinder head on the end of said pump body, and a cylinder liner retainer disposed between the end of said cylinder liner and said cylinder head, an apparatus for continuously and automatically maintaining said liner packing tight comprising: a booster cylinder having first and second cylindrical cavities of different diameters disposed in said pump between said cylinder head and said cylinder liner retainer; a piston head of a given diameter fixed to said cylinder head and telescopically receiving said first cylindrical cavity thereover to define a first closed chamber; a booster piston having a diameter less than said given diameter reciprocally mounted in said second cylindrical cavity to close the same to define a second closed chamber; and passage means connecting said first and second chambers including a check valve for passing hydraulic fluid only from said second chamber to said first chamber, said booster piston being subject to the pressure of fluid pumped by said fluid pump, so that said pressure moves said booster piston into said second chamber to force hydraulic fluid through said passage means to said first chamber, to in turn force said booster cylinder away from said cylinder head and against said cylinder liner retainer to compress said liner packing and tighten the same.

References Cited in the file of this patent

UNITED STATES PATENTS 2,786,425     Yarbrough             Mar. 26, 1957